United States Patent
Kim et al.

(10) Patent No.: US 6,823,689 B2
(45) Date of Patent: Nov. 30, 2004

(54) FASTENING STRUCTURE FOR ICE MAKER OF REFRIGERATOR

(75) Inventors: Ill-Shin Kim, Changwon (KR); Sung-Koo Son, Masan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/410,277

(22) Filed: Apr. 10, 2003

(65) Prior Publication Data

US 2003/0192336 A1 Oct. 16, 2003

(30) Foreign Application Priority Data

Apr. 13, 2002 (KR) ................................. 10-2002-0020250

(51) Int. Cl.[7] ................................................. F25C 1/24
(52) U.S. Cl. ..................... 62/300; 248/231.91; 403/381
(58) Field of Search .................... 62/298, 300; 403/331, 403/353, 354, 381; 248/201, 231.91

(56) References Cited

U.S. PATENT DOCUMENTS 4,754,615 A * 7/1988 Linstromberg ............... 62/300
RE34,174 E * 2/1993 Brown et al. ................. 62/135

\* cited by examiner

*Primary Examiner*—William E. Tapolcai
(74) *Attorney, Agent, or Firm*—Fleshner & Kim, LLP

(57) ABSTRACT

A fastening device for an ice maker of a refrigerator is provided which improves ease and efficiency of installation is provided. Mounting brackets formed along a side of the ice maker each include an insertion portion formed as an opening in the mounting bracket, and a catching portion formed as an opening adjacent to the insertion portion and with a smaller width than that of the insertion portion. Hangers having a large diameter portion and a small diameter portion are affixed to the wall of the freezing chamber by a fastener, and the mounting brackets are slid onto the hangers until the small diameter portion of the hanger is caught in the catching section of the mounting bracket. The ice maker may be further secured by additional fixing brackets opposite the mounting brackets. This fastening device allows the ice maker to be more easily installed while also minimizing the potential for damage to the brackets or the wall surface of the freezer during installation.

8 Claims, 3 Drawing Sheets

FASTENING STRUCTURE FOR ICE MAKER OF REFRIGERATOR

BACKGROUND OF THE INVENTION

1. Field of Invention

The present relates to an ice maker of a refrigerator, and more particularly, to a fastening structure for an ice maker of a refrigerator, which is used for mounting the ice maker to the interior of a freezing chamber of the refrigerator.

2. Description of the Prior Art

An ice maker is generally installed in a freezing chamber of a refrigerator so that ice can be made and used. A configuration and mounting structure of an ice maker are shown in FIGS. 1 and 2. As shown in the figures, the ice maker 1 is provided with an ice-making container 3. The ice-making container 3 is filled with water which in turn is made into ice with a predetermined shape. The ice-making container 3 is formed of a material with good thermal conductivity, e.g., aluminum.

A driving unit 5 is provided at a portion corresponding to an end of the ice-making container 3. The driving unit 5 includes a variety of parts used for operations of the ice maker 1. The ice-making container 3 is provided with an ice-releasing lever 7 that is rotated by a driving source included in the driving unit 5 and discharges ice made in the ice-making container 3. Elongated strippers 9 are provided along a lateral side of the ice-making container 3. The strippers 9 function to prevent ice discharged from the ice-making container 3 by the ice-releasing lever 7 from coming back into the ice-making container 3. The ice-releasing lever 7 and strippers 9 are constructed such that they do not interfere with each other. Reference numeral 11 designates an ice-detecting lever that detects the amount of ice contained in an ice storage container, not shown, provided below the ice-making container 3.

Mounting brackets 13 are provided at predetermined upper portions of the other lateral side of the ice-making container 3. The mounting brackets 13 are used for mounting the ice maker 1 to a wall surface of a freezing chamber F. The mounting brackets 13 are formed integrally with the lateral side of the ice-making container 3 and are provided with fastening holes 13h used for fastening by means of screws 17. Fixing brackets 13' are provided at lower portions of the lateral side of the ice-making container 3 where the mounting brackets 13 are formed. The fixing brackets 13' are also formed with fastening holes 13h used for fastening by means of the screws 17.

Screw fasteners 15 for ensuring firm screwing of the screws 17 are provided in the wall surface of the freezing chamber F to which the ice maker 1 is mounted. The screw fasteners 15 are generally disposed in a thermal isolation layer within the wall surface for defining the freezing chamber F.

Mounting of the ice maker 1 to the wall surface of the freezing chamber F according to the prior art constructed as above will be described. After the mounting brackets 13 and the fixing brackets 13' of the ice maker 1 are placed at positions corresponding to the screw fasteners 15, the screws 17 penetrate the mounting and fixing brackets 13 and 13' and then are screwed into the screw fasteners 15. When the screws 17 are screwed in such a way, the ice maker 1 is completely mounted.

However, there is the following problems in the aforementioned prior art.

Since the interior of the freezing chamber F is generally a relatively small space, a worker should hold the ice maker 1 with one hand and simultaneously handle tools, screws and the like with the other hand. Therefore, there are problems in that it is inconvenient to perform the fastening work for the ice maker 1 and workability is deteriorated.

Further, when the plurality of mounting and fixing brackets 13 and 13' are fastened to the wall surface of the freezing chamber F by using the screws 17, there may be problems in that if any one of the screws 17 is excessively screwed, the installed state of the ice maker 1 is distorted and the brackets 13 and 13' are even broken in a more severe case.

SUMMARY OF THE INVENTION

The present invention is, accordingly, contemplated to solve the aforementioned problems in the prior art. An object of the present invention is to allow an ice maker of a refrigerator to be more easily mounted to the refrigerator.

Another object of the present invention is to allow the ice maker to be relatively accurately installed.

According to the present invention for achieving the objects, there is provided a structure for fastening an ice maker, which makes ice in an ice-making container of the ice maker, to a wall surface of a freezing chamber of a refrigerator, comprising mounting brackets each of which is formed at one side of the ice maker and includes an insertion section with a predetermined width formed to penetrate therethrough and an catching section with a width relatively smaller than that of the insertion section formed to penetrate therethrough; and hangers each of which includes a large diameter portion with a diameter corresponding to the width of the insertion section and a small diameter portion with a diameter corresponding to the width of the catching section. The small diameter portion is mounted on the wall surface of the freezing chamber. The large diameter portions pass through the insertion sections of the mounting brackets and the small diameter portions are seated in the catching sections, whereby the mounting brackets are hung on the hangers.

The mounting brackets may be formed at relatively upper portions of the ice maker.

The insertion sections of the mounting brackets may be open at portions thereof opposite to the catching sections.

The structure may further comprise fixing brackets for fastening the ice maker to the wall surface of the freezing chamber at a lower end of the ice maker opposite to positions where the mounting brackets are formed.

With the fastening structure for the ice maker of the refrigerator according to the present invention constructed as above, there are advantages in that the ice maker can be easily fastened to the freezing chamber and a more accurately fastened state of the ice maker is established.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Hereinafter, a preferred embodiment of a fastening structure for an ice maker of a refrigerator according to the present invention will be described in detail with reference to the accompanying drawings.

Figure 1:
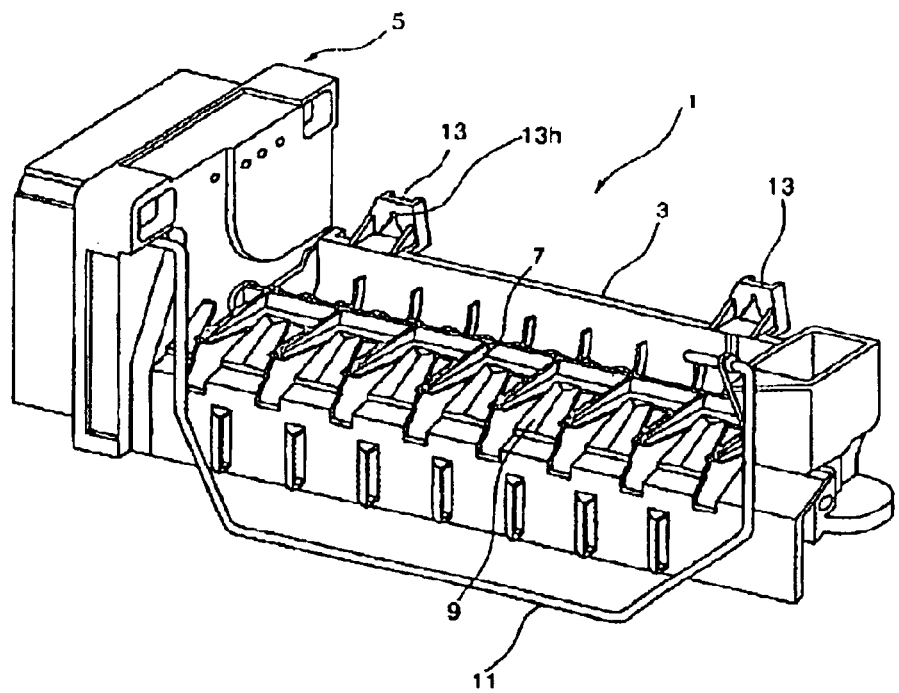
FIG. 1 is a perspective view of an example of a general ice maker.
Figure 2:
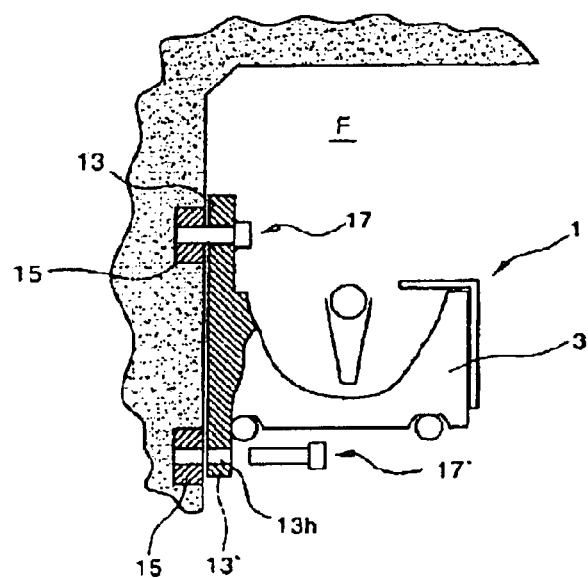
FIG. 2 is a sectional view showing a conventional fastening structure for an ice maker.
Figure 3:
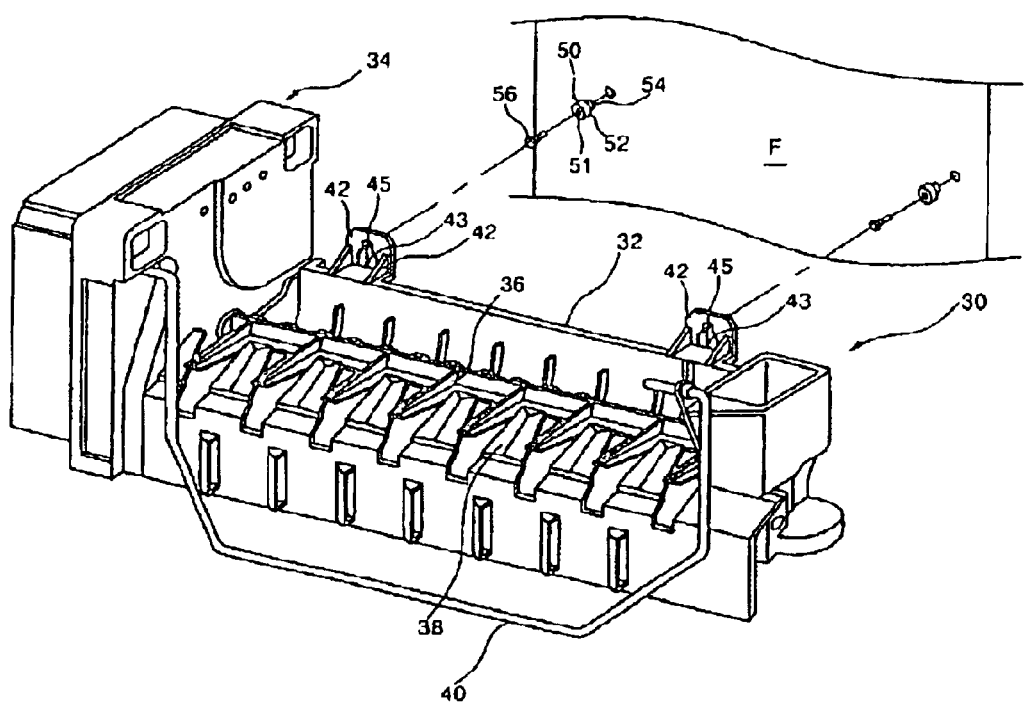
FIG. 3 is an exploded perspective view of a preferred embodiment of a fastening structure for an ice maker of a refrigerator according to the present invention.
Figure 4:
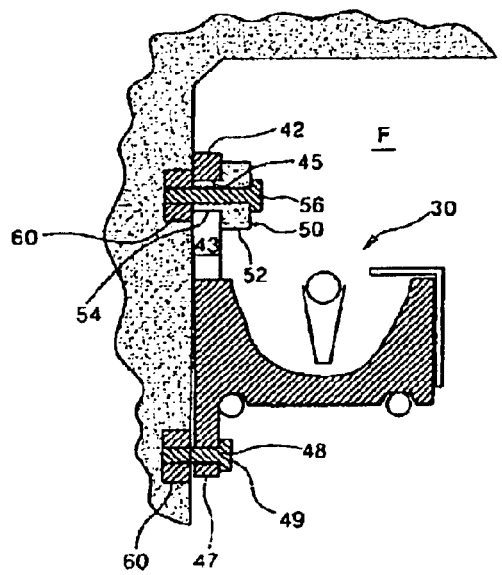
FIG. 4 is a sectional view of the configuration of the preferred embodiment of the present invention.
Figure 5:
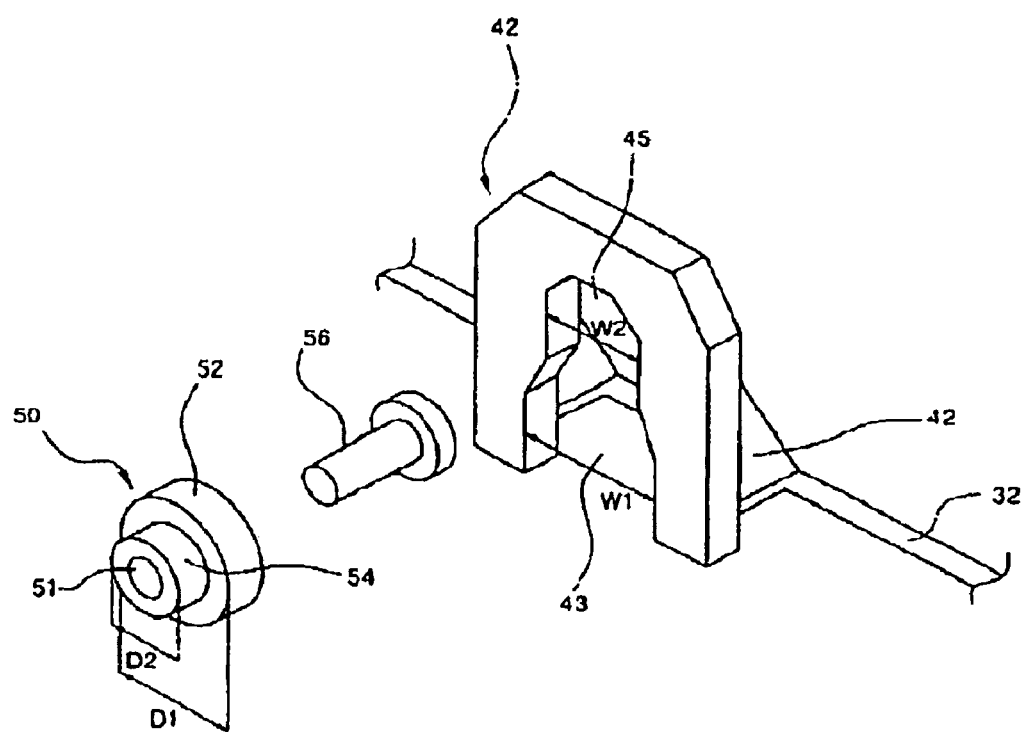
FIG. 5 is an exploded perspective view showing the configuration of a major portion of the preferred embodiment of the present invention.

FIG. 3 is an exploded perspective view of the preferred embodiment of the fastening structure for the ice maker of the refrigerator according to the present invention, FIG. 4 is a sectional view of the configuration of the preferred embodiment of the present invention, and FIG. 5 is an exploded perspective view showing the configuration of a major portion of the preferred embodiment of the present invention.

As shown in the figures, the ice maker 30 is installed in a freezing chamber F to make ice and includes an ice-making container 32. Water is supplied to and contained in the ice-making container 32, and the water is then made into ice. The ice-making container 32 is formed of a material with good thermal conductivity. The ice-making container 32 may take a variety of shapes. However, in the present embodiment, the ice-making container 32 has a cross section in the form of a half moon and is elongated in one direction.

A driving unit 34 is provided at an end of the ice-making container 32. The driving unit 34 includes a variety of parts used for operations of the ice maker 30. For instance, a motor for driving an ice-releasing lever 36 to be explained later and parts for controlling the motor are installed in the driving unit.

The ice-releasing lever 36 is provided in the ice-making container 32. The ice-releasing lever 36 is connected at one end thereof to the motor of the driving unit 34 so that it can receive power therefrom to be rotated. The ice-releasing lever 36 is to deliver ice made in the ice-making container 32 to the outside. Strippers 38 are provided along a lateral side of the ice-making container 32 to prevent ice discharged from the ice-making container 32 by the ice-releasing lever 36 from coming back into the ice-making container 32. The strippers 38 and the ice-releasing lever 36 should be constructed so that they do not interfere with each other. Reference numeral 40 designates an ice-detecting lever.

A plurality of mounting brackets 42 are formed at predetermined upper portions of the other lateral side of the ice-making container 32. In the present embodiment, the mounting brackets 42 are formed integrally with an upper end of the lateral side of the ice-making container 32. The mounting brackets 42 are formed to extend above the ice-making container 32 from connection portions 42' protruding laterally from the upper end of the lateral side of the ice-making container 32.

Each of the mounting brackets 42 is formed with an insertion section 43 and a catching section 45 to transversely penetrate therethrough. The width W1 of the insertion section 43 is formed to be relatively larger than the width W2 of the catching section 45. The insertion section 43 is formed such that a portion thereof opposite to the catching section 45, i.e. a lower portion of the mounting bracket 42 directed to a lower portion of the ice-making container 32, is fully open. However, the insertion section 43 is not necessarily limited to such a configuration of the present embodiment so far as a large diameter portion 52 of one of hangers 50 to be explained later passes through the insertion section 43.

The width W2 of the catching section 45 is formed to be relatively smaller than that of the insertion section 43. It is sufficient that a small diameter portion 54 of one of the hangers 50 to be explained later can be caught in the catching section. The catching section 45 should be formed to penetrate through the mounting bracket 42 and to communicate with the insertion section 43.

Fixing brackets 47 are formed at lower portions of the ice-making container 32. A plurality of fixing brackets 47 may be formed along the length of the ice-making container 32. The fixing brackets 47 function to fasten a lower end of the ice-making container 32 to the wall surface of the freezing chamber F. The fixing brackets 47 are formed with fastening holes 48. The fastening holes 48 allow screws 49 to pass therethrough and to be screwed into the wall surface of the freezing chamber F so as to fix the ice maker 30 thereto. The fixing brackets 47 are not necessarily provided and may be eliminated depending on specifications of the ice maker 30.

Fastening holes 51 are formed to longitudinally penetrate through the centers of the hangers 50. Screws 56 penetrate through the fastening holes 51. Each of the hangers 50 is formed to generally take the shape of a cylinder and comprises the large diameter portion 52 with a relatively large outer diameter D1 and the small diameter portion 54 with a relatively small outer diameter D2.

The outer diameter D1 of the large diameter portion 52 is identical to or smaller than the width W1 of the insertion section 43 of the mounting bracket 42. The outer diameter D2 of the small diameter portion 54 is identical to or smaller than the width W2 of the catching section 45 of the mounting bracket 42.

The hangers 50 are fastened to the wall surface of the freezing chamber F by means of the screws 56. At this time, each of the hangers 50 should be installed in such a manner that the small diameter portion 54 of the hanger 50 is in contact with the wall surface of the freezing chamber F. Although the hangers 50 are illustrated as taking the shape of a cylinder in the present embodiment, they are not necessarily limited thereto but may be in the form of a variety of shapes such as a square pillar.

Meanwhile, in order to ensure firm screwing of the screws 56 for fastening the hangers 50 and the screws 49 for fastening the fixing brackets 47, screw fasteners 60 are provided within the wall surface of the freezing chamber F.

Hereinafter, the operation of the fastening structure for the ice maker of the refrigerator constructed as above will be described in detail.

A process of mounting the ice maker 30 in the present embodiment will be first described. The hangers 50 are fastened to the wall surface of the freezing chamber F by means of the screws 56. The hangers 50 are installed such that the small diameter portions 54 are in close contact with the wall surface. The screws 56 can more firmly fix the hangers 50 as the screws 56 are screwed into the screw fasteners 60. The plurality of hangers 50 corresponding to the number of mounting brackets 42 are installed to the wall surface of the freezing chamber F.

When the hangers 50 are completely installed, the ice maker 30 is then hung on the hangers 50. At this time, the large diameter portions 52 of the hangers 50 are inserted into the insertion sections 43 of the mounting brackets 42 of the ice maker 30. The large diameter portions 52 pass through the insertion sections 43 from one sides of the mounting brackets 42 and extend above the ice-making container 32. In such a state, the small diameter portions 54 are positioned in the insertion sections 43.

When the entire ice maker 30 is then lowered, the small diameter portions 54 are moved from the insertion sections 43 to the catching sections 45 and seated in the catching sections 45. In such a state, as can be seen from FIG. 4, the mounting brackets 42 are positioned between the wall surface of the freezing chamber F and one sides of the large diameter portions 52. At this time, the ice maker 30 is in a state where it is fixed to the wall surface of the freezing chamber F.

Then, in order to more firmly fasten the ice maker 30 to the wall surface, the fixing brackets 47 are fastened to the wall surface by screwing the screws 49 into the screw fasteners 60. The fastening of the fixing brackets 47 using the screw fasteners 60 in such a way prevents the ice maker 30 from being accidentally demounted even through a sudden external force is exerted on the ice maker 30.

With the fastening structure for the ice maker of the refrigerator according to the present invention as described in detail above, the following advantages can be obtained.

Since the hangers are first installed on the wall surface and the mounting brackets of the ice maker are then hung thereon to fix the ice maker, there is an advantage in that the fastening work for the ice maker can be more easily and quickly performed.

Further, since the ice maker is installed simply by hanging the mounting brackets on the hangers and only the fixing brackets are fastened to the wall surface of the freezing chamber by means of the screws, the number of times of screwing the screws is relatively reduced and thus damage to the brackets or the wall surface of the freezing chamber due to the fastening using the screws can be minimized and distortion of the fastened state can be avoided.

The scope of the present invention is not limited to the embodiment described and illustrated above but is defined by the appended claims. It will be apparent that those skilled in the art can make various modifications and changes thereto within the scope of the invention defined by the claims.

What is claimed is:

1. A device for installing an ice maker in a freezing chamber of a refrigerator, comprising:
    a plurality of mounting brackets formed along a side of the ice maker, wherein each of the plurality of mounting brackets comprises:
        a first section formed as an opening of predetermined width in the mounting bracket which penetrates through the mounting bracket; and
        a second section formed as an opening adjacent the opening of the first section, wherein a width of the second section is smaller than the width of the first section; and
    a plurality of hangers configured to be affixed to a wall of the freezing chamber with a fastener, wherein each of the plurality of hangers is substantially cylindrical in shape, wherein an opening formed therethrough is configured to receive a fastener therein so as to install the hanger on a wall of the freezing chamber, and wherein each of the plurality of hangers comprises:
        a first portion with a width corresponding to the width of the first section of the mounting bracket; and
        a second portion with a width corresponding to the width of the second section of the mounting bracket, wherein the second portion is configured to be positioned adjacent a wall of the freezing chamber, and wherein the first portion of each of the plurality of hangers is configured to pass through the first section of a corresponding mounting bracket, and the second portion of each of the plurality of hangers is configured to be engaged with the second section of a corresponding mounting bracket so as to hang each of the plurality of mounting brackets on a corresponding hanger of the plurality of hangers.

2. The device of claim 1, wherein the plurality of mounting brackets are formed along upper portions of the ice maker.

3. The device of claim 1, wherein the first section of each of the plurality of mounting brackets is open at a portion thereof which is opposite the second section.

4. The device of claim 1, further comprising a plurality of fixing brackets configured to further fasten the ice maker to a wall of the freezing chamber at a lower end of the ice maker at a position opposite to that of the plurality of mounting brackets.

5. The device of claim 1, wherein the number of mounting brackets is equal to the number of hangers.

6. An ice maker comprising the device of claim 1.

7. A refrigerator comprising the ice maker of claim 6.

8. The device of claim 1, wherein each fastener installed in the opening formed in a corresponding hanger is configured to be fully threaded into a respective receiving portion of the freezer wall.

\* \* \* \* \*